United States Patent
Hathiramani et al.

(10) Patent No.: US 12,063,674 B2
(45) Date of Patent: Aug. 13, 2024

(54) REDUCED CHANNEL STATE INFORMATION REPORTING TIME FOR CELL ACTIVATION

(71) Applicant: NOKIA TECHNOLOGIES OY, Espoo (FI)

(72) Inventors: Navin Hathiramani, Coppell, TX (US); Karri Markus Ranta-Aho, Espoo (FI); Benoist Pierre Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 197 days.

(21) Appl. No.: 17/491,978

(22) Filed: Oct. 1, 2021

(65) Prior Publication Data

US 2023/0105497 A1 Apr. 6, 2023

(51) Int. Cl.
*H04W 72/54* (2023.01)
*H04L 5/00* (2006.01)
(Continued)

(52) U.S. Cl.
CPC .......... *H04W 72/54* (2023.01); *H04L 5/0051* (2013.01); *H04W 72/23* (2023.01); *H04W 76/30* (2018.02); *H04W 80/02* (2013.01)

(58) Field of Classification Search
None
See application file for complete search history.

(56) References Cited

U.S. PATENT DOCUMENTS

2019/0149213 A1 5/2019 Zhou et al.
2019/0379494 A1* 12/2019 Kakishima ............ H04L 5/0053
(Continued)

FOREIGN PATENT DOCUMENTS

EP 3596863 B1 4/2020
EP 3817252 A1 5/2021
(Continued)

OTHER PUBLICATIONS

3rd Generation Partnership Project; Technical Specification Group Radio Access Network; NR; Medium Access Control (MAC) protocol specification (Release 16); 3GPP TS 38.321, V16.5.0, Jun. 2021.
(Continued)

*Primary Examiner* — Alex Skripnikov
(74) *Attorney, Agent, or Firm* — SQUIRE PATTON BOGGS (US) LLP

(57) ABSTRACT

Systems, methods, apparatuses, and computer program products for reducing channel state information (CSI) reporting time for cell activation are provided. One method may include receiving, from a network node, one or more semi-persistent (SP) channel state information (CSI) configurations to be employed during secondary cell (SCell) activation, and receiving an activation command for a secondary cell (SCell) and information on a semi-persistent (SP) channel state information (CSI) configuration to be activated from among the one or more semi-persistent (SP) channel state information (CSI) configurations. The method may also include measuring a CSI-reference signal (RS) using the semi-persistent (SP) channel state information (CSI) configuration indicated with the activation command and transmitting a semi-persistent (SP) channel state information (CSI) report for a subset of secondary cells (SCells) available for activation.

17 Claims, 3 Drawing Sheets

(51) Int. Cl.
*H04W 72/23* (2023.01)
*H04W 76/30* (2018.01)
*H04W 80/02* (2009.01)

(56) References Cited

U.S. PATENT DOCUMENTS

| | | | |
|---|---|---|---|
| 2020/0029316 A1 | 1/2020 | Zhou et al. | |
| 2020/0145164 A1* | 5/2020 | Cheng | H04W 52/265 |
| 2021/0235388 A1 | 7/2021 | Jeon et al. | |
| 2022/0279521 A1* | 9/2022 | Cui | H04W 72/542 |

FOREIGN PATENT DOCUMENTS

| | | | | |
|---|---|---|---|---|
| WO | 2018141377 A1 | 9/2018 | | |
| WO | 2020/201124 A1 | 10/2020 | | |
| WO | 2020/264369 A1 | 12/2020 | | |
| WO | WO-2021064670 A1 * | 4/2021 | | H04L 1/1812 |

OTHER PUBLICATIONS

3rd Generation Partnership Project; Technical Specification Group Radio Access Network; NR; Radio Resource Control (RRC) protocol specification (Release 16); 3GPP TS 38.331, V16.5.0, Jun. 2021.

3rd Generation Partnership Project; Technical Specification Group Radio Access Network; NR; Physical layer procedures for data (Release 16); 3GPP TS 38.214, V16.6.0, Jun. 2021.

3rd Generation Partnership Project; Technical Specification Group Radio Access Network; NR; Requirements for support of radio resource management (Release 17); 3GPP TS 38.133, V17.2.0, Jun. 2021.

Huawei, "Revised WID on Further Multi-RAT Dual-Connectivity enhancements", 3GPP TSG RAN Meeting #88e, RP-201040, Jun. 29, 2020.

VIVO: "Fallback to long period CSI report", 3GPP Draft; R2-1807574_FALLBACK to Long Period CSI Report, 3rd Generation Partnership Project (3GPP), Mobile Competence Centre ; 650, Route Des Lucioles ; F-06921 Sophia-Antipolis Cedex ; France vol. RAN WG2, No. Busan, Korea; May 20, 2018.

International Search Report and Written Opinion dated Sep. 13, 2022, corresponding to International Patent Application No. PCT/EP2022/075346.

Parruca et al., "Rate selection analysis under semi-persistent scheduling in LTE networks", IEEE Conference Publication, 2013 International Conference on Computing, Networking and Communications (ICNC), Jan. 28, 2013, Abstract.

* cited by examiner

US 12,063,674 B2

REDUCED CHANNEL STATE INFORMATION REPORTING TIME FOR CELL ACTIVATION

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for reducing channel state information (CSI) reporting time for cell activation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus including at least one processor and at least one memory comprising computer program code. The at least one memory and computer program code configured, with the at least one processor, to cause the apparatus at least to receive, from a network node, one or more semi-persistent (SP) channel state information (CSI) configurations to be employed during secondary cell (SCell) activation along with a default channel state information (CSI) configuration. The apparatus may be further caused to receive an activation command for a secondary cell (SCell) and information on a semi-persistent (SP) channel state information (CSI) configuration to be activated from among the one or more semi-persistent (SP) channel state information (CSI) configurations, and to use the semi-persistent (SP) channel state information (CSI) configuration indicated with the activation command to measure a channel state information (CSI)-reference signal (RS) and transmitting a semi-persistent (SP) channel state information (CSI) report for a subset of secondary cells (SCells) available for activation.

An embodiment may be directed to a method including receiving, from a network node, one or more semi-persistent (SP) channel state information (CSI) configurations to be employed during secondary cell (SCell) activation along with a default channel state information (CSI) configuration. The method may also include receiving an activation command for a secondary cell (SCell) and information on a semi-persistent (SP) channel state information (CSI) configuration to be activated from among the one or more semi-persistent (SP) channel state information (CSI) configurations, and using the semi-persistent (SP) channel state information (CSI) configuration indicated with the activation command to measure a channel state information (CSI)-reference signal (RS) and transmitting a semi-persistent (SP) channel state information (CSI) report for a subset of secondary cells (SCells) available for activation.

An embodiment may be directed to an apparatus including means for receiving, from a network node, one or more semi-persistent (SP) channel state information (CSI) configurations to be employed during secondary cell (SCell) activation along with a default channel state information (CSI) configuration. The apparatus may also include means for receiving an activation command for a secondary cell (SCell) and information on a semi-persistent (SP) channel state information (CSI) configuration to be activated from among the one or more semi-persistent (SP) channel state information (CSI) configurations, and means for using the semi-persistent (SP) channel state information (CSI) configuration indicated with the activation command to measure a channel state information (CSI)-reference signal (RS) and transmitting a semi-persistent (SP) channel state information (CSI) report for a subset of secondary cells (SCells) available for activation.

An embodiment may be directed to an apparatus including at least one processor and at least one memory comprising computer program code. The at least one memory and computer program code configured, with the at least one processor, to cause the apparatus at least to provide, to a user equipment, one or more semi-persistent (SP) channel state information (CSI) configurations to be employed for secondary cell (SCell) activation along with a default channel state information (CSI) configuration, and to transmit, to the user equipment, a command for activation of a secondary cell (SCell) and information on a semi-persistent (SP) channel state information (CSI) configuration to be activated from among the one or more semi-persistent (SP) channel state information (CSI) configurations.

An embodiment may be directed to a method including providing, to a user equipment, one or more semi-persistent (SP) channel state information (CSI) configurations to be employed for secondary cell (SCell) activation along with a default channel state information (CSI) configuration. The method may also include transmitting, to the user equipment, a command for activation of a secondary cell (SCell) and information on a semi-persistent (SP) channel state information (CSI) configuration to be activated from among the one or more semi-persistent (SP) channel state information (CSI) configurations.

An embodiment may be directed to an apparatus including means for providing, to a user equipment, one or more semi-persistent (SP) channel state information (CSI) configurations to be employed for secondary cell (SCell) activation along with a default channel state information (CSI) configuration. The apparatus may also include means for transmitting, to the user equipment, a command for activation of a secondary cell (SCell) and information on a semi-persistent (SP) channel state information (CSI) configuration to be activated from among the one or more semi-persistent (SP) channel state information (CSI) configurations.

BRIEF DESCRIPTION OF THE DRAWINGS

For proper understanding of example embodiments, reference should be made to the accompanying drawings, wherein.

DETAILED DESCRIPTION

Figure 1:
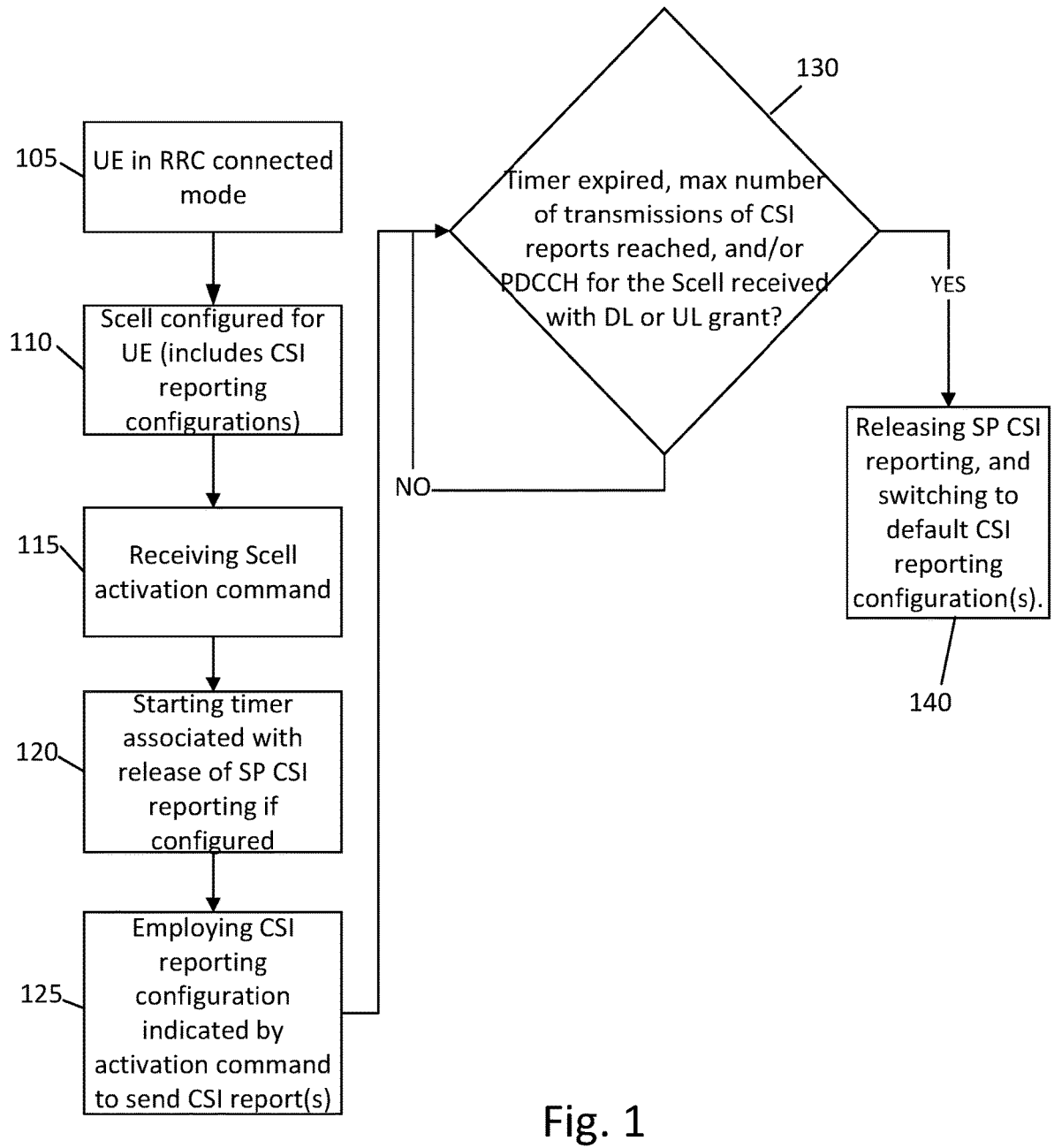
FIG. 1 illustrates an example flow diagram of a method, according to some example embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for reducing channel state information (CSI) reporting time for cell activation, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Further enhancements to multi-RAT dual-connectivity enhancements are currently being considered. The objectives of these enhancements may include providing support for an efficient activation/de-activation mechanism for one secondary cell group (SCG) and secondary cells (SCells). Support for one SCG may apply to next generation (NG) E-LTRAN New Radio-Dual Connectivity (EN-DC), and 5G dual connectivity (NR-DC). Support for SCells may apply to NR carrier aggregation (CA). These objectives can apply to frequency range 1 (FR1) and frequency range 2 (FR2).

It is expected that fast cell activation would be facilitated by the gNB sending a temporary reference signal (RS) burst or two for the UE to quickly achieve synchronization on the to-be-activated SCell. The gNB may send the fast activation and temporary-RS trigger (including indication of the number of temp-RS bursts and their timing) in a medium access control (MAC)-control element (CE) message. This can aid a UE in setting its automatic gain control (AGC) and fine-tuning for time and frequency, however a SCell is not considered active until after a channel state information (CSI) report has been sent by the UE. It is noted that, as described herein, fast cell activation may refer to a reduction in the activation time when compared to the baseline activation time of 3GPP Release-15 or Release 16.

One of the bottlenecks to achieving the fast Scell activation seems to be the UE sending a CSI report. Typically, networks configure UEs for periodic CSI reporting and the periodicity of these reports is set such that network can minimize overhead and ensure optimal link adaptation. Low frequency CSI reporting can be compensated with aperiodic CSI reporting.

Extremely frequent CSI reporting not only leads to additional overhead, but can also limit the number of radio resource configuration (RRC) configured users in a cell. For fast SCell activation, it would be desirable for a UE to be able to send a CSI report as soon as it has a measurement available; however, after the activation there may not be a need for frequent reporting.

Current approaches to tackle this issue range from just configuring periodic CSI reporting with a periodicity of one slot to triggering an aperiodic CSI. However, these approaches seem to be less than optimal. For example, periodic reporting with one slot periodicity suffers from the drawbacks outlined above. Meanwhile, with aperiodic reporting, the gNB is unaware of when the UE would be ready to receive the aperiodic CSI-RS transmission for CSI measurement and reporting.

Therefore, as discussed in detail herein, certain example embodiments can address at least the issues noted above, as well as other possible problems that may not be explicitly discussed herein.

Some example embodiments provide a methodology to reduce the CSI reporting time for SCell activation, e.g., based on the semi-persistent (SP) CSI reporting framework. According to an embodiment, a UE may be configured with one or more SP CSI configurations to be employed during SCell activation along with other default (and already specified) CSI reporting methods, such as periodic and aperiodic CSI reporting methods.

According to an embodiment, during SCell activation, a gNB may send a UE, for example within a MAC-CE, information on the SP CSI configuration to be activated. The SP CSI configuration may include details of SP CSI-RS transmissions the gNB sends to the UE, and/or the SP CSI reporting resource to be used for the UE to transmit the SP CSI reports.

In certain embodiments, upon setting AGC and achieving time and frequency synchronization with the newly activated SCell(s), a UE may employ the SP CSI configuration to measure a CSI-RS and to transmit a CSI report for the subset of SCell(s) that are available for fast activation. According to one embodiment, the UE may transmit substantially the same CSI report on several reporting occasions. The repetition of the report can be linked to the periodicity of the configuration depending on how often the UE can produce a new report. For example, assuming the UE can produce a new report at a 3rd slot, if a configuration with one slot periodicity is configured, the substantially same report would be repeated 3 times in a row. In some embodiments, the UE may also alternate the CSI reports if more than one SCell is available for fast activation as per priority rules for CSI reports.

According to certain embodiments, upon receiving a DL or UL grant for the SCell being activated, the UE may then deactivate the SP CSI reporting and fallback to its default CSI reporting methods configured for the SCell. In an embodiment, the UE may also be pre-configured for with a criteria based on the number of transmissions and/or time for the deactivation of SP-CSI reporting. It should be noted that, according to some embodiments, the activation of SP CSI configuration via MAC-CE may be applicable to both SP CSI reporting on physical uplink shared channel (PUSCH) and physical uplink control channel (PUCCH).

FIG. 1 illustrates an example flow diagram of a method for handling of CSI reporting, according to an example embodiment. For instance, the method of FIG. 1 may enable fast SCell activation with reduced CSI reporting time. In certain example embodiments, the flow diagram of FIG. 1 may be performed by a communication device in a communications system, such as LTE or 5G NR. For instance, in some example embodiments, the communication device performing the method of FIG. 1 may include a UE, sidelink (SL) UE, wireless device, mobile station, IoT device, UE type of roadside unit (RSU), other mobile or stationary device, or the like.

As illustrated in the example of FIG. 1, at 105, it may be assumed that a UE is in RRC connected mode and, at 110, a SCell is configured for the UE with at least two CSI reporting configurations. In an embodiment, at least one of the CSI reporting configurations is a SP CSI reporting mode to be employed during fast SCell activation. The SP CSI reporting configurations may additionally include a criteria to determine when to deactivate the SP CSI reporting. For example, this criteria can be based on a number of CSI report transmissions, a release timer, and/or receipt of PDCCH for the SCell with a DL or UL grant.

As further illustrated in the example of FIG. 1, at 115, a SCell activation command may be received, which can include an indication to switch to a pre-configured SP CSI reporting. Upon receiving the SCell activation command which includes the indication to switch to a pre-configured SP CSI reporting, the UE may, at 120, start a timer associated with the allowed time that SP CSI reporting is permitted if this timer was configured. Additionally or alternatively, at 125, the UE may use the configured SP reporting to send CSI reports, e.g., until it receives an uplink (UL) or downlink (DL) grant for the SCell being activated from its scheduling cell.

In the example of FIG. 1, at 130, it may be determined whether the timer associated with the SP CSI reporting has expired or, if the UE is configured for a maximum number of CSI report transmissions, whether the maximum number of transmissions of CSI reporting has been reached, and/or whether a PDCCH for the SCell has been received with a DL or UL grant. If it is determined that the timer associated with the SP CSI reporting has expired, that the UE was configured for a maximum number of CSI report transmissions and this number of transmissions is reached, and/or that a PDCCH for the SCell has been received with a DL or UL grant, then at 140, the UE may release the SP CSI reporting configuration, fall-back to the default CSI reporting configurations and proceed with SCell activation according to normal 3GPP established procedures. It is noted that, if more than one SCell is activated, a common SP CSI reporting may be configured for the SCells being activated and the SP CSI reporting may be available until the UE has activated the SCells targeted for fast activation. Upon deactivating the SP CSI reporting, the UE will fall back to the preconfigured default CSI reporting schemes for the activated SCell(s).

It is noted that, in some embodiments, a timer and/or maximum number of transmissions of CSI reporting might not be configured or provided. In such a case, the example method of FIG. 1 may include, at 130, determining if a PDCCH for the SCell has been received with a DL or UL grant. If it is determined that a PDCCH for the SCell has not been received with a DL or UL grant, the method may return to procedure 130. However, if it is determined that a PDCCH for the SCell has been received with a DL or UL grant, then the method may proceed to procedure 140 to release the SP CSI reporting configuration and switch to the default CSI reporting configurations, as discussed above.

It is noted that FIG. 1 is provided as one example embodiment of a method or process. However, certain embodiments are not limited to this example, and further examples are possible as discussed elsewhere herein. For instance, in some embodiments, a timer might not be configured and therefore different criteria might be used for releasing or deactivating of the SP CSI reporting.

Figure 2:
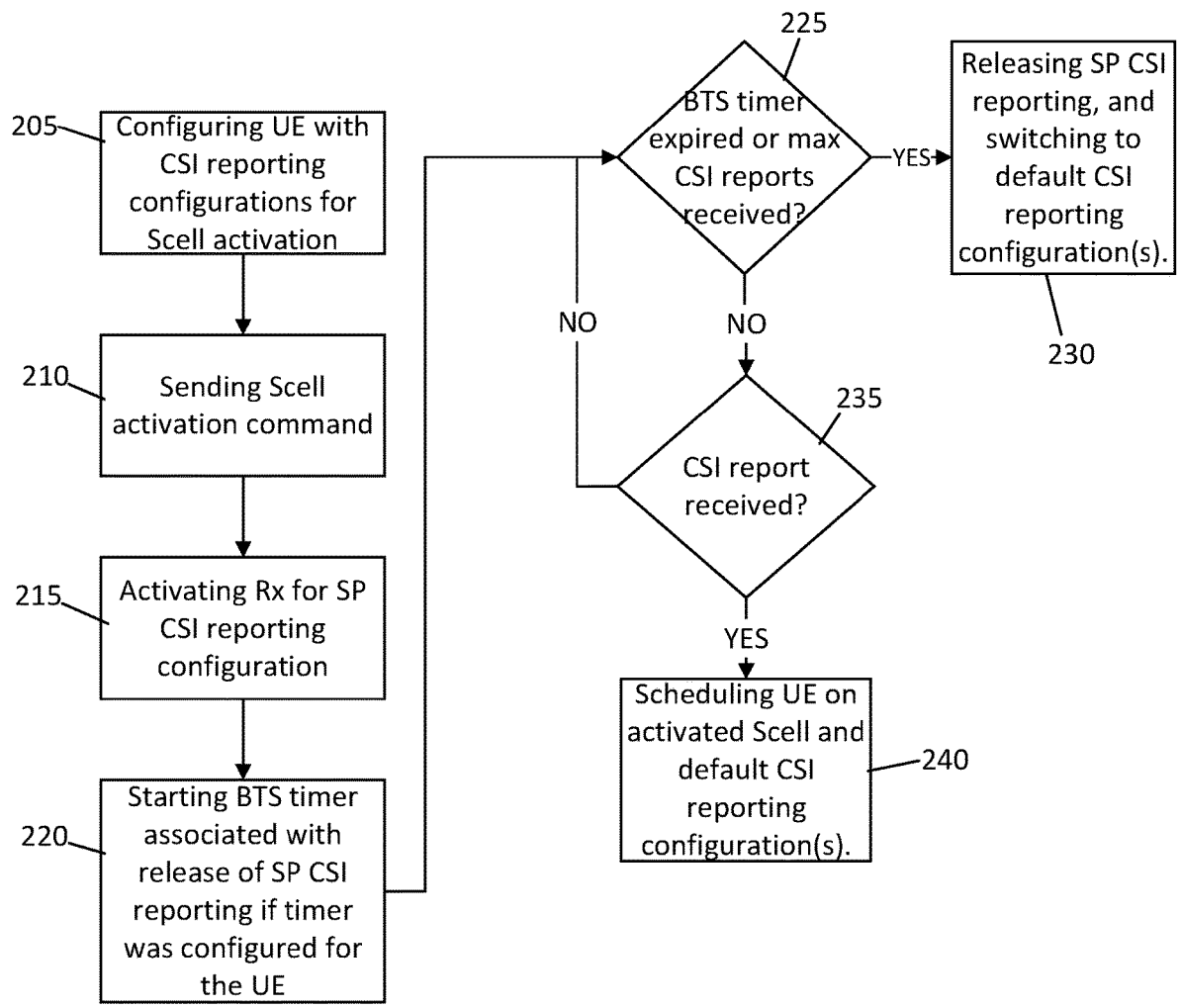
FIG. 2 illustrates an example flow diagram of a method, according to some example embodiments.

FIG. 2 illustrates an example flow diagram of a method for handling of CSI reporting, according to one embodiment. For example, the method of FIG. 2 can enable fast SCell activation of reduced CSI reporting time. In certain example embodiments, the flow diagram of FIG. 2 may be performed by a network entity or network node in a communications system, such as LTE or 5 GNR. In some example embodiments, the network entity performing the method of FIG. 2 may include or be included in a base station, access node, node B, eNB, gNB, gNB-DU, gNB-CU, NG-RAN node, 5G node, transmission-reception points (TRPs), high altitude platform stations (HAPS), relay station, or the like.

As illustrated in the example of FIG. 2, at 205, the method may include configuring a SCell for the UE with CSI reporting configurations. At 210, a SCell activation command may be sent to the UE. For example, in an embodiment, during SCell activation, information on the SP CSI configuration to be activated may be sent to the UE in MAC CE. At 215, receiver (Rx) for the SP CSI reporting configuration may be activated.

According to an embodiment, if the UE is configured with a timer (e.g., timer_ue) upon whose expiry the UE should release the SP-CSI reporting configuration as discussed with respect to FIG. 1, then the network node may have its own timer (denoted as BTS timer or timer_bts in the example of FIG. 1). In one embodiment, the BTS timer may be greater than the UE timer (i.e., timer_bts>timer_ue) to possibly account for the uncertainty in when exactly the UE activates the timer and a reasonable number of maximum number of transmissions that should be allowed for the UE. As illustrated in the example of FIG. 2, at 220, the BTS timer may be started. At 225, it may be determined whether the BTS timer has expired or whether the maximum number of SP CSI reports have been received. If it is determined that the BTS timer has expired and/or that the maximum number of SP CSI reports have been received, the method may include, at 230, releasing SP CSI reporting and switching to default CSI reporting configuration(s).

As further illustrated in the example of FIG. 2, at 235, it may be determined whether a CSI report has been received. If not, then the method may return to procedure 225. When a CSI report is received for a SCell targeted for activation, at 240, the method may include scheduling the UE on the SCell that has been activated and switching back to the default preconfigured CSI reporting mode, i.e., disabling the SP CSI reporting. It should also be noted that a UE does not have to transmit on the SP CSI reporting resources configured for fast SCell activation and, hence, the serving cells do not need to consider the absence of reports towards error or failure detection scenarios.

To implement certain example embodiments, the CSI-ReportingConfig information element (IE) may be modified to allow SP CSI reporting to be nested within a periodic (default) CSI reporting configuration. In order to reduce overhead, as well as potentially simplifying resource management at the gNB, the SP CSI reporting configuration may be signaled using the default CSI reporting configuration as basis (for instance with the default configuration being a subset of the SP CSI reporting configuration). Additionally, in an embodiment, the CSI-ReportingConfig IE may be modified to include the timer and number of transmission criteria for release of the SP CSI reporting. In some embodiments, reporting periodicity for SP CSI may be reduced to at least one slot. According to an example embodiment, MAC CE for fast SCell activation may be modified to include a code point to signal the CSI reporting configuration to be activated. If just one SP CSI reporting configuration is or can be configured, then the new codepoint may be omitted from the MAC CE. In certain embodiments, a UE does not have to transmit a CSI report on at least one SP CSI reporting occasion and may repeat the substantially same CSI report on several occasions, which may impact the timing of what to report on a given occasion based on the CSI computation times. Further, some embodiments may provide for the deactivation for SP CSI reporting upon grant reception, timer expiry or maximum number of transmissions reached.

It is noted that FIG. 2 is provided as one example embodiment of a method or process. However, certain embodiments are not limited to this example, and further examples are possible as discussed elsewhere herein. For instance, in some embodiments, a timer might not be configured and instead different criteria might be used for determining when to release or deactivate the SP CSI reporting.

Figure 3A:
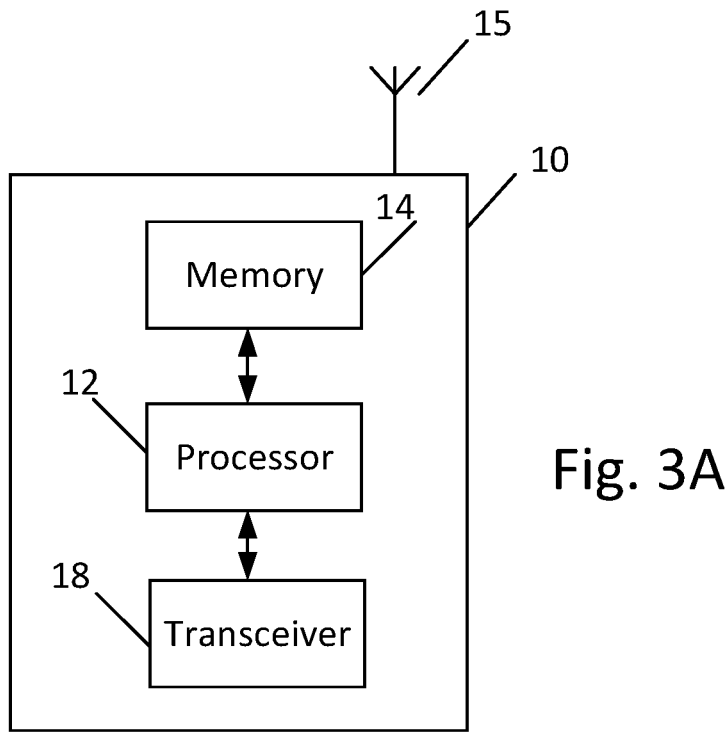
FIG. 3A illustrates an example block diagram of an apparatus, according to an embodiment.

FIG. 3A illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a substantially same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 3A.

As illustrated in the example of FIG. 3A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 3A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-2, or any other method described herein. In some embodiments, as discussed herein, apparatus 10 may be configured to perform a procedure relating to CSI reporting, e.g., that can reduce the CSI reporting time for fast cell activation, for example.

According to an embodiment, apparatus 10 may be controlled by memory 14 and processor 12 to provide, to a UE, one or more SP CSI configurations to be employed for SCell activation. In an embodiment, apparatus 10 may be controlled by memory 14 and processor 12 to transmit, to the UE, a command for activation of a SCell and to provide information on a SP CSI configuration to be activated from among the one or more SP CSI configurations that were provided. In one example, the information on the SP CSI configuration to be activated may be included within a MAC CE.

According to some embodiments, the SP CSI configuration may include details of the SP CSI-reference signal (RS) transmissions that the apparatus 10 sends, and/or may include SP CSI reporting resource(s) to be used to transmit SP CSI reports. In an embodiment, apparatus 10 may be controlled by memory 14 and processor 12 to receive, from the UE, at least one SP CSI report for the SCell that has been activated, to schedule the UE on the SCell that has been activated, and to disable or deactivate reporting of the SP CSI.

In certain embodiments, apparatus 10 may be controlled by memory 14 and processor 12 to configure a criteria for determining when to deactivate the SP CSI reporting. For example, the configured criteria may be based on a number of permitted SP CSI report transmissions and/or may be based on a timer during which SP CSI report transmissions are permitted. According to an embodiment, when the number of permitted SP CSI report transmissions is reached or when the timer expires, apparatus 10 may be controlled by memory 14 and processor 12 to release or deactivate the SP CSI configuration and switch to default CSI reporting configured for the SCell.

FIG. 3A illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a substantially same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 3A.

As illustrated in the example of FIG. 3A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 3A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-2, or any other method described herein. In some embodiments, as discussed herein, apparatus 10 may be configured to perform a procedure relating to CSI reporting that can reduce the CSI reporting time for cell activation, for example.

According to an embodiment, apparatus 10 may be controlled by memory 14 and processor 12 to provide, to a UE, one or more SP CSI configurations to be employed for SCell activation, along with a default CSI configuration. In an embodiment, apparatus 10 may be controlled by memory 14 and processor 12 to transmit, to the UE, a command for activation of a SCell and to provide information on a SP CSI configuration to be activated from among the one or more SP CSI configurations that were provided. In one example, the information on the SP CSI configuration to be activated may be included within a MAC CE.

According to some embodiments, the SP CSI configuration may include details of the SP CSI-reference signal (RS) transmissions sent from the apparatus 10, and/or may include SP CSI reporting resource(s) to be used to transmit SP CSI reports. In an embodiment, apparatus 10 may be controlled by memory 14 and processor 12 to receive, from the UE, at least one SP CSI report for the SCell that has been activated, to schedule the UE on the SCell that has been activated, and to disable or deactivate reporting of the SP CSI.

In certain embodiments, apparatus 10 may be controlled by memory 14 and processor 12 to configure a criteria for determining when to deactivate the SP CSI reporting. For example, the configured criteria may be based on a number of permitted SP CSI report transmissions and/or may be based on a timer during which SP CSI report transmissions are permitted. According to an embodiment, when the number of permitted SP CSI report transmissions is reached or when the timer expires, apparatus 10 may be controlled by memory 14 and processor 12 to release or deactivate the SP CSI configuration and switch to default CSI reporting configured for the SCell.

Figure 3B:
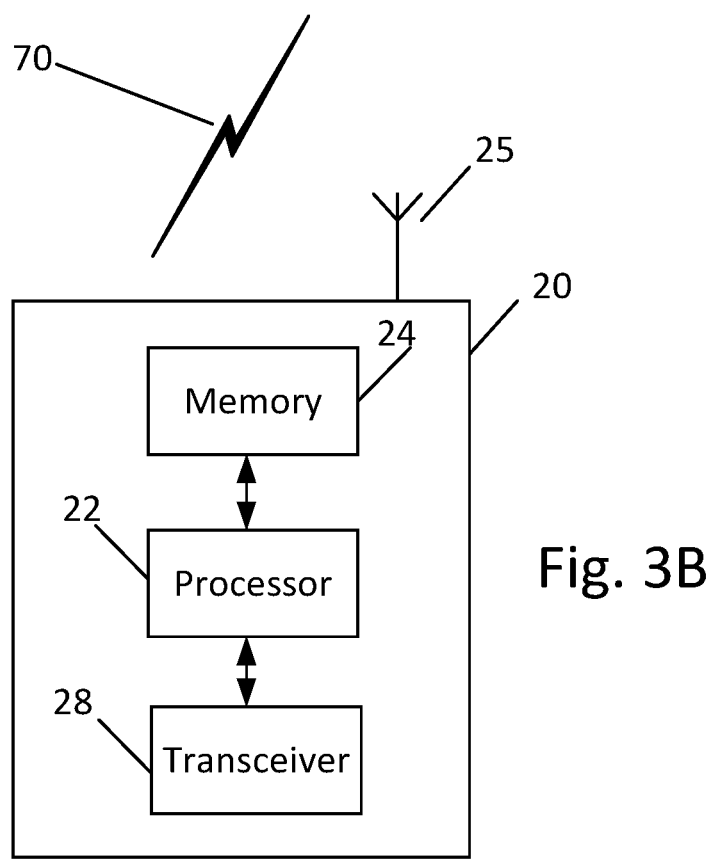
FIG. 3B illustrates an example block diagram of an apparatus, according to an embodiment.

FIG. 3B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 3B.

As illustrated in the example of FIG. 3B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-2, or any other method described herein. For example, in an embodiment, apparatus 20 may be controlled to perform a process relating to CSI reporting, e.g., that can reduce the CSI reporting time for cell activation, as described in detail elsewhere herein.

In an embodiment, apparatus 20 may be controlled by memory 24 and processor 22 to receive, from a network node (e.g., a gNB), one or more SP CSI configurations to be employed during SCell activation, along with a default CSI configuration. According to an embodiment, apparatus 20 may also be controlled by memory 24 and processor 22 to receive an activation command for a SCell and information on a SP CSI configuration to be activated from among the one or more SP CSI configurations. In one embodiment, apparatus 20 may be controlled by memory 24 and processor 22 to use the SP CSI configuration indicated with the activation command to measure a CSI-RS and transmit a SP CSI report for a subset of SCells available for activation. According to one example, the information on the SP CSI configuration to be activated may be included within a MAC CE.

According to certain embodiments, the SP CSI configuration may include details of the SP CSI-RS transmissions from the network node (i.e., sent by the network node), and/or may include a SP CSI reporting resource to be used to transmit the SP CSI reports. In some embodiments, to transmit the SP CSI report, apparatus 20 may be controlled by memory 24 and processor 22 to transmit the substantially same SP CSI report on more than one reporting occasion, and/or to alternate the SP CSI reports if more than one SCell is available for fast activation.

In some embodiments, when a DL or UL grant for the SCell being activated is received, apparatus 20 may be controlled by memory 24 and processor 22 to deactivate the SP CSI reporting and switch to the default CSI reporting that is configured for the SCell.

According to an embodiment, the received SP CSI configurations may include criteria for determining when to deactivate the SP CSI reporting. For example, the criteria may be based on a number of permitted SP CSI report transmissions, may be based on a timer during which SP CSI report transmissions are permitted, and/or may be based on receipt of a PDCCH for the SCell with a DL or UL grant. In one embodiment, when the number of permitted SP CSI report transmissions is reached or when the timer expires, apparatus 20 may be controlled by memory 24 and processor 22 to release the SP CSI configuration and switch to default CSI reporting as configured for the SCell.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, sensors, circuits, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. For example, as discussed in detail above, certain example embodiments are configured to provide methods, apparatuses and/or systems that enable fast SCell activation with reduced CSI reporting time. Some embodiments provide a method to ensure minimum delay due to CSI reporting during fast SCell activation, which in turn minimizes the delay from sending the SCell activation command for an SCell to being able to schedule data on the freshly activated SCell. The overhead introduced by certain embodiments is also minimal since it will not require additional steps for activation (it will be embedded within the SCell activation process), deactivation is implicitly performed by the first scheduling message for the freshly activated SCell, and thus the active period for the SP CSI reporting is small (if active period of the SP CSI reporting is large due to no data scheduled on the freshly activated SCell, then there is no need for the fast SCell activation in the first place). In addition, by allowing more than one configuration, certain embodiments may allow the gNB to manage multiple UEs in parallel more efficiently.

Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations needed for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

AGC: Automatic Gain Control
CE: Control Element
CSI: Channel State Information
DCI: Downlink Control Information
DL: Downlink
MAC: Medium Access Control
PUCCH: Physical Uplink Control Channel
PUSCH: Physical Uplink Shared Channel
RS: Reference Symbol
SCell: Secondary Cell
SP: Semi-persistent
SRS: Sounding Reference Symbol
Temp: Temporary
UE: User equipment
UL: Uplink
ZP: Zero Power.

We claim:

1. An apparatus, comprising:
at least one processor; and
at least one memory comprising computer program code,
the at least one memory and computer program code configured, with the at least one processor, to cause the apparatus at least to perform:
receiving, from a network node, one or more semi-persistent (SP) channel state information (CSI) configurations to be employed during secondary cell (SCell) activation along with a default channel state information (CSI) configuration;
receiving an activation command for a secondary cell (SCell) and information on a semi-persistent (SP) channel state information (CSI) configuration to be activated from the one or more semi-persistent (SP) channel state information (CSI) configurations;
using the semi-persistent (SP) channel state information (CSI) configuration indicated with the activation command to measure a channel state information (CSI)-reference signal (RS) from the network node, and transmitting a semi-persistent (SP) channel state information (CSI) report for a subset of secondary cells (SCells) available for activation; and
when a downlink or uplink grant for the secondary cell (SCell) being activated is received, deactivating the semi-persistent (SP) channel state information (CSI) configuration and switching to the default channel state information (CSI) configuration for the secondary cell (SCell).

2. The apparatus of claim 1, wherein the information on the semi-persistent (SP) channel state information (CSI) configuration to be activated is included within a medium access control (MAC) control element (CE).

3. The apparatus of claim 1, wherein the semi-persistent (SP) channel state information (CSI) configuration comprises at least one of: details of semi-persistent (SP) channel state information (CSI)-reference signal (RS) transmissions from the network node, or a semi-persistent (SP) channel state information (CSI) reporting resource to be used to transmit semi-persistent (SP) channel state information (CSI) reports.

4. The apparatus of claim 1, wherein the transmitting of the semi-persistent (SP) channel state information (CSI) report comprises at least one of:

transmitting a same semi-persistent (SP) channel state information (CSI) report on more than one reporting occasion; or alternating the semi-persistent (SP) channel state information (CSI) reports if more than one secondary cell (SCell) is available for activation.

5. The apparatus of claim 1, wherein the received semi-persistent (SP) channel state information (CSI) configurations comprise a criteria for determining when to deactivate the semi-persistent (SP) channel state information (CSI) configuration, and wherein the criteria is based on at least one of a number of permitted semi-persistent (SP) channel state information (CSI) report transmissions, a timer during which semi-persistent (SP) channel state information (CSI) report transmissions are permitted, or receipt of a physical downlink control channel (PDCCH) for the secondary cell (SCell) with the downlink or uplink grant.

6. The apparatus of claim 5, wherein, when the number of permitted semi-persistent (SP) channel state information (CSI) report transmissions is reached or when the timer expires, the at least one memory and computer program code are configured, with the at least one processor, to cause the apparatus at least to perform:

releasing the semi-persistent (SP) channel state information (CSI) information (CSI) configuration and switching to the default channel state configuration for the secondary cell (SCell).

7. A method, comprising:

receiving, from a network node, one or more semi-persistent (SP) channel state information (CSI) configurations to be employed during secondary cell (SCell) activation along with a default channel state information (CSI) configuration;

receiving an activation command for a secondary cell (SCell) and information on a semi-persistent (SP) channel state information (CSI) configuration to be activated from the one or more semi-persistent (SP) channel state information (CSI) configurations;

using the semi-persistent (SP) channel state information (CSI) configuration indicated with the activation command to measure a channel state information (CSI)-reference signal (RS) from the network node, and transmitting a semi-persistent (SP) channel state information (CSI) report for a subset of secondary cells (SCells) available for activation; and in response to a downlink or uplink grant for the secondary cell (SCell) being activated being received, deactivating the semi-persistent (SP) channel state information (CSI) configuration and switching to the default channel state information (CSI) configuration for the secondary cell (SCell).

8. The method of claim 7, wherein the information on the semi-persistent (SP) channel state information (CSI) configuration to be activated is included within a medium access control (MAC) control element (CE).

9. The method of claim 7, wherein the semi-persistent (SP) channel state information (CSI) configuration comprises at least one of: details of semi-persistent (SP) channel state information (CSI)-reference signal (RS) transmissions from the network node, or a semi-persistent (SP) channel state information (CSI) reporting resource to be used to transmit semi-persistent (SP) channel state information (CSI) reports.

10. The method of claim 7, wherein the transmitting of the semi-persistent (SP) channel state information (CSI) report comprises at least one of:

transmitting a same semi-persistent (SP) channel state information (CSI) report on more than one reporting occasion; or alternating the semi-persistent (SP) channel state information (CSI) reports if more than one secondary cell (SCell) is available for activation.

11. The method of claim 7, wherein the received semi-persistent (SP) channel state information (CSI) configurations comprise a criteria for determining when to deactivate the semi-persistent (SP) channel state information (CSI) configuration, and wherein the criteria is based on at least one of a number of permitted semi-persistent (SP) channel state information (CSI) report transmissions, a timer during which semi-persistent (SP) channel state information (CSI) report transmissions are permitted, or receipt of a physical downlink control channel (PDCCH) for the secondary cell (SCell) with the downlink or uplink grant.

12. The method of claim 11, wherein, when the number of permitted semi-persistent (SP) channel state information (CSI) report transmissions is reached or when the timer expires, the method comprises:

releasing the semi-persistent (SP) channel state information (CSI configuration and switching to the default channel state information (CSI) configuration for the secondary cell (SCell).

13. An apparatus, comprising:

at least one processor; and at least one memory comprising computer program code, the at least one memory and computer program code configured, with the at least one processor, to cause the apparatus at least to perform:

providing, to a user equipment, one or more semi-persistent (SP) channel state information (CSI) configurations to be employed for secondary cell (SCell) activation along with a default channel state information (CSI) configuration;

transmitting, to the user equipment, a command for activation of a secondary cell (SCell) and information on a semi-persistent (SP) channel state information (CSI) configuration to be activated from the one or more semi-persistent (SP) channel state information (CSI) configurations; and when a number of permitted semi-persistent (SP) channel state information (CSI) report transmissions is reached or when a timer expires, releasing the semi-persistent (SP) channel state information (CSI) configuration and switching to the default channel state information (CSI) configuration for the secondary cell (SCell).

14. The apparatus of claim 13, wherein the information on the semi-persistent (SP) channel state information (CSI) configuration to be activated is included within a medium access control (MAC) control element (CE).

15. The apparatus of claim 13, wherein the semi-persistent (SP) channel state information (CSI) configuration comprises at least one of: details of semi-persistent (SP) channel state information (CSI)-reference signal (RS) transmissions from the apparatus, or a semi-persistent (SP) channel state information (CSI) reporting resource to be used to transmit semi-persistent (SP) channel state information (CSI) reports.

16. The apparatus of claim 13, wherein the at least one memory and computer program code are configured, with the at least one processor, to cause the apparatus at least to perform:

receiving, from the user equipment, at least one semi-persistent (SP) channel state information (CSI) report for the secondary cell (SCell) that has been activated;

scheduling the user equipment on the secondary cell (SCell) that has been activated; and disabling reporting of the semi-persistent (SP) channel state information (CSI).

17. The apparatus of claim 13, wherein the at least one memory and computer program code are configured, with the at least one processor, to cause the apparatus at least to perform:

configuring a criteria for determining when to deactivate the semi-persistent (SP) channel state information (CSI) configuration, wherein the criteria is based on at least one of the number of permitted semi-persistent (SP) channel state information (CSI) report transmissions or the timer during which semi-persistent (SP) channel state information (CSI) report transmissions are permitted.

* * * * *